United States Patent [19]

Hamilton

[11] Patent Number: 5,678,440
[45] Date of Patent: Oct. 21, 1997

[54] SCREW CONVEYORS, AUGERS AND FLIGHTING FOR USE THEREIN

[75] Inventor: Michael Douglas Hamilton, Pinner, England

[73] Assignee: Lenham Machinery Limited, England

[21] Appl. No.: 699,188

[22] Filed: Aug. 19, 1996

Related U.S. Application Data

[63] Continuation of Ser. No. 403,704, Mar. 17, 1995, abandoned.

[30] Foreign Application Priority Data

Sep. 21, 1992 [GB] United Kingdom ............... 9219950
Sep. 23, 1992 [GB] United Kingdom ............... 9224481

[51] Int. Cl.$^6$ ............................... B21D 11/14; B21D 31/00
[52] U.S. Cl. ................................................ 72/136; 72/371
[58] Field of Search ............... 72/137, 167; 29/888.023, 29/889, 889.6

[56] References Cited

U.S. PATENT DOCUMENTS 1,684,254   4/1928   Bailey ................................. 72/137
2,262,227  11/1941   Fulson ................................ 72/137
2,280,847   4/1942   Pitcher ............................... 72/136

*Primary Examiner*—Lowell A. Larson
*Assistant Examiner*—Rodney A. Butler
*Attorney, Agent, or Firm*—Diller, Ramik & Wight, PC

[57] ABSTRACT

In a continuous screw conveyor or auger, the rotatable screw member (12) comprises a helical radial blade (28) (known as "flighting") which is preferably carried on a central driving shaft (26). The flighting (28) is formed by rolling a rectangular metal strip of uniform thickness between a pair of opposed, preferably offset, conical rolls (56, 58). In contrast to prior art rolls which have similar unstepped conical rolling surfaces, and produce a helical blade of which the radial thickness reduce progressively from the inner helical edge (30) of the blade to the outer helical edge (32), the present invention provides on at least one of those rolls (58) a stepped conical rolling surface (94) formed so as to exert less rolling pressure on an outer portion of the helical blade (28) being formed, thereby to produce a blade in which the outer portion is of a thickness (preferably uniform) which is no less than and preferably greater than that of an inner part of the blade lying immediately radially inwards thereof.

17 Claims, 3 Drawing Sheets

SCREW CONVEYORS, AUGERS AND FLIGHTING FOR USE THEREIN

This application is a continuation of application Ser. No. 08/403,704, filed Mar. 17, 1995, now abandoned.

BACKGROUND OF THE INVENTION

This invention relates to methods and machines for producing continuous helical flighting for use in screw conveyors, augers and like material transporting, conveying or propelling means, and to machines incorporating such flighting.

Screw conveyors, augers and the like means incorporate or comprise a screw member for propelling particulate, granular or other free-flowing material (solid or liquid) along the length of the screw member in an axial direction as determined by the sense of rotation of the screw member. The propulsion of that material is achieved by the successive turns of a continuous helical (spiral) blade (known in the art as flighting) which in most cases encircles, is secured on, and radiates from a central driving shaft which is arranged for rotation by an appropriate power source (manual or otherwise). However, some screw conveyors comprise solely such flighting, the flighting itself being driven by the power source, and the intrinsic strength of the flighting being sufficient to maintain the helical shape of the flighting whilst being driven.

In the case of a screw conveyor, the material being propelled by the successive turns of the blade is confined to the spaces between successive turns by a casing which encloses and cooperates with the outer periphery of the blade. In the case of hole-boring augers, however, the material being propelled by the successive turns of the blade is confined to the spaces between successive turns by the cylindrical wall of the hole being bored by the auger.

Though in some cases the screw member is of integral form, in most cases and for a variety of reasons, it is customary to form the helical blade separately, and independently of the driving shaft, first by rolling a metal strip between opposed mutually-inclined surfaces of a pair of rolls to form continuous rolled flighting, and then by securing it, for example by welding, on the driving shaft. The rolls may be mounted in alignment with one another (i.e. with their respective rotational axes in a common plane), or in an offset manner (i.e. with their respective rotational axes in transversely spaced planes).

It is also customary (a) to use rolls of conical form, and (b) to form the helical blade from metal strip of rectangular cross section and uniform thickness (see, for example, patent specification U.S. Pat. No. 2,262,227 (FULSON)).

As a natural consequence of the rolling process to form a helical blade of which the the length of an outer edge of the blade is substantially greater than that of an inner edge portion of the blade, the thickness of the blade at its outer edge, measured (for example) normal to the blade, is substantially less than that at said inner edge portion (see, for example, patent specification U.S. Pat. No. 2,262,227 (FULSON), FIGS. 12–16). In other words, in the rolling process, the uniform thickness, rectangular strip is converted into a blade of which the thickness of the blade progressively reduces from said inner edge portion to the outer edge. That reduction in thickness typically amounts to 50% of the thickness of said inner edge portion of the blade. The thickness at said inner edge portion is normally substantially the same as (or even greater than) that of the metal strip from which the blade is rolled.

Patent specification U.S. Pat. No. 2,262,227 (FULSON) discloses one example of a process for rolling such an helical blade for use as flighting, using mutually-inclined conical rolls. Patent specification GB 736,838 (WURAG) discloses another process of rolling such an helical blade, using parallel conical rolls.

In some cases, the whole of the transverse width of the metal strip has been passed between such rolls (as in the above-mentioned prior patent specifications), so as to produce a helical blade in which the blade thickness varied across the whole of the radial extent of the blade, that is, from the inner edge of the blade to the outer edge thereof. In such cases, said inner edge portion has been constituted merely by that inner edge of the blade.

In other cases, only part of the transverse width of the metal strip has been passed between the rolls, so as to produce a helical blade in which the blade thickness varied in only that part of the metal strip that had passed between the rolls. In those cases, said inner edge portion has extended a substantial radial distance from said inner edge towards the outer edge of the blade.

Furthermore, it is found in practice that the wear of the blade due to the friction of the material being axially propelled by the blade is greatest at the outer periphery of the blade (i.e. at the fastest moving part of the blade), so that the part of the blade that is initially the thinnest is subjected to the greatest rate of wear (see, for example, patent specification U.S. Pat. No. 1,684,254 (BAILEY)). This causes the blade to be discarded or refurbished prematurely, at a time when the inner parts of the blade still have substantial thickness and life.

To overcome that disadvantage, patent specification U.S. Pat. No. 1,684,254 (BAILEY) provided at the outer edge of a cold rolled helical blade a "thickened reinforcement or bead". Patent specification SU 772,664 (SAFRONOV) also provided a thickened outer edge portion on a rolled helical blade. Patent specification GB 472,254 (BARKER) disclosed the use of a thickened outer edge portion on a cast form of archimedian screw, to overcome the greater wear that occurs at that portion of the screw.

Patent specification SU 772,664 (SAFRONOV) also discloses a rolling process in which (a) the main rolls 1,2 for producing the helical blade from a strip of rectangular transverse cross section have stepped rolling surfaces, (b) the cone angles of the main rolls 1,2 is relatively small, (c) the angle of inclination of their rotational axes is likewise relatively small, (d) an auxiliary pair of edge-forming rolls 6,7 is used to simultaneously thicken up the outer edge portion of the helical blade, and (e) the use of an edge-forming rolling pressure directed transversely to the main helix-forming rolling pressure is essential to the process described. In addition, the main rolls 1,2 and the auxiliary rolls 6,7 are capable of rolling only one size of strip material 8 and of producing only one size of helical blade 9. Moreover, the ingoing metal strip suffers a substantial reduction in the height of the strip during the rolling process.

SUMMARY OF THE INVENTION

The present invention seeks to overcome the disadvantages of the SAFRONOV disclosure, in providing a less complicated and more versatile rolling method and apparatus.

For simplicity and convenience, in the description and the claims that follow hereafter, the helical blade will be referred to as "flighting" wherever convenient or appropriate, since this term is well known and understood in the art.

The prior art (SAFRONOV) referred to above discloses a method of producing a continuous rolled flighting which is suitable for use in screw conveyors, augers and the like material transporting, conveying or propelling means, which flighting (known per se) comprises a continuous helical blade having radially spaced inner and outer helical edges, and which blade comprises Integrally (a) an inner helical portion which extends radially from the inner edge to a predetermined intermediate radius and (b) an outer helical portion which extends from the intermediate radius to the outer edge, and in which blade the transverse thickness of the blade in the inner helical portion decreases gradually from a maximum value, to a minimum value at the intermediate radius, whereas the thickness of the blade in the outer helical portion is no less than said minimum value. That Method Comprises:

(a) providing a pair of opposed, mutually-inclined conical rolls of which at least one roll has a stepped conical rolling surface divided by a graduated diameter-reducing step progressing from an 'apex' conical section of the rolling surface to a 'base' conical section of the rolling surface, thereby when in operation to produce a pressure differential in adjoining inner and outer portions respectively of a metal strip being rolled;

(b) rotating those rolls in complementary directions;

(c) introducing a continuous metal strip of substantially rectangular cross section and substantially constant height between the rotating rolls, thereby to cause it to be converted by the rolls into a helical blade constituting said continuous rolled flighting, in which blade the inner helical portion has been formed by the apex conical section of the stepped rolling surface, and the outer helical portion has been formed by the base conical section of the stepped rolling surface; and (d) receiving and supporting said flighting on emerging from the rolls.

According to one aspect of the present invention, such a method is characterised in that conical rolls are arranged so that in the step (c) above the continuous metal strip is converted by the conical rolls alone into said continuous helical blade, without substantially reducing the height of the metal strip and without a simultaneous application to the metal strip of pressures directed transversely to the pressures exerted on the metal strip by the conical rolls.

If desired, the second one of the conical rolls may likewise have a stepped rolling surface thereby to produce by said method flighting in which the helical blade has the outer helical portion projecting outwardly on both sides of the blade relative to the respective adjacent surfaces of the inner helical portion of the blade.

The prior art (SAVRONOV) also discloses a rolling machine which incorporates a pair of opposed, mutually-inclined conical rolls of which at least one roll has a stepped conical rolling surface divided by a diameter-reducing graduated step progressing from an 'apex' conical section of the rolling surface to a 'base' conical section of the rolling surface, thereby when in rolling operation on an ingoing metal strip of substantially rectangular cross section and a substantially constant height to produce a pressure differential in adjoining portions of the metal strip, and so produce continuous flighting in which the outer portion of the helical blade constituting the flighting projects outwardly on one side of the blade relative to an adjacent surface of the inner portion of the blade.

According to a second aspect of the present invention, in such a rolling machine, the conical rolls are arranged so that they alone form the helical blade, without substantially reducing the height of the metal strip and unaided by any means for simultaneously applying to the metal strip pressures directed transversely to the pressures exerted thereon by the conical rolls.

If desired, each of said conical rolls may have a stepped conical rolling surface divided by a diameter-reducing graduated step progressing from an 'apex' conical section of the rolling surface to a 'base' conical section of the rolling surface, thereby when in rolling operation on an ingoing metal strip of substantially rectangular cross section and a substantially constant height to produce a pressure differential in adjoining portions of the metal strip, and so produce continuous flighting in which the outer portion of the helical blade constitituting said flighting projects outwardly on both sides of the blade relative to adjacent surfaces of the inner portion of the blade.

In such an alternative rolling machine, the conical rolls are likewise arranged so that they alone form the helical blade, without substantially reducing the height of the metal strip and unaided by any means for simultaneously applying to the metal strip pressures directed transversely to the pressures exerted thereon by the conical rolls.

In either of the rolling machines just referred to above, the respective conical rolls may be positioned relative to one another so that their respective rotational axes lie offset from one another in spaced planes.

A rolling machine according to the present invention may include for the or each stepped conical roll, a roll housing, and a roll shaft rotatably mounted in the roll housing, the roll shaft having formed therein at one end a roll-receiving socket, and the roll being provided with attachment means for detachably securing the roll in the socket.

The or each roll attachment means may comprise (a) a tapered stub shaft carried by the associated conical roll, which stub shaft is provided with a screw-threaded end portion, and (b) in the associated roll shaft a tapered socket for receiving the tapered stub shaft, and a screw thread for receiving the screw-threaded end portion of the stub shaft.

The present invention also extends to flighting as produced by a rolling method, or a rolling machine, according to the present invention. In such flighting, (a) the blade thickness may decrease gradually from the inner helical edge, or only from a predetermined radius disposed between the inner helical edge and the intermediate radius; and (b) the blade thickness in the outer helical portion may remain substantially constant with increase in radius towards the outer edge, or otherwise be greater than the minimum value.

An excess of the outer helical portion thickness over the minimum inner helical portion thickness may comprise an integral band of metal which projects outwardly relative to an adjacent surface of the inner helical portion, thereby to form a projection on one side only (preferably, the material propelling side) of the blade.

Alternatively, the excess of the outer helical portion thickness over the inner helical portion thickness may comprise respective integral bands of metal which project outwardly relative to respective adjacent surfaces of the Inner helical portion thereby to form projections on both sides of the blade.

Other features of the present invention will become apparent from a reading of the description that follows hereafter and of the claims appended at the end of that description.

One screw conveyor, continuous rolled flighting incorporated in that conveyor, a preferred method of making that continuous flighting, and an apparatus for carrying out that method of making continuous flighting, all according to the present invention, will now be described by way of preferred example, and with reference to the accompanying diagrammatic drawings.

DESCRIPTION OF THE PREFERRED EMBODIMENTS

Figure 1:
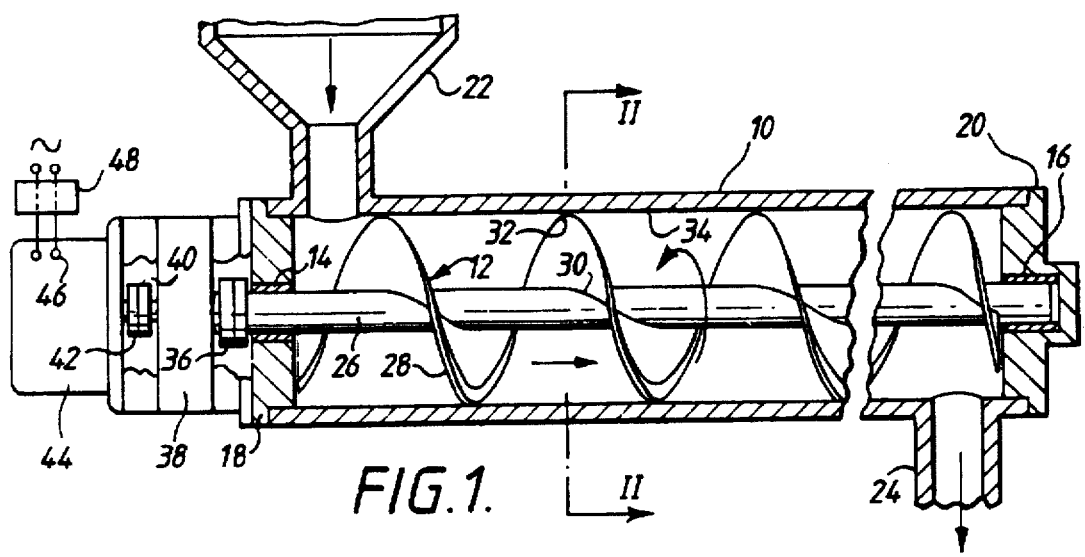
FIG. 1 shows a part sectional side elevation of the screw conveyor incorporating a screw member comprising continuous rolled flighting according to the present invention.
Figure 2:
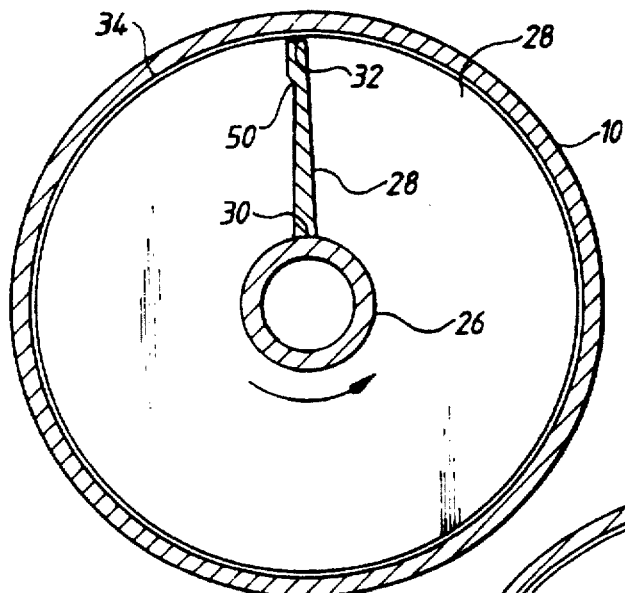
FIG. 2 shows a transverse section of a screw member incorporated in the screw conveyor of FIG. 1, as seen at the section II—II of FIG. 1.

Referring now to the drawings, the screw conveyor illustrated in the FIGS. 1 and 2 comprises a cylindrical casing 10 which encloses a rotatable steel screw 12. The screw is carried for rotation within the casing in bearings 14,16 mounted in end plates 18,20 which close the respective ends of the casing. An inlet funnel/hopper 22 opens into the upper portion of the casing 10 at its left hand end, whilst an outlet duct 24 opens from the casing at the lower portion of the right hand of the casing.

The screw 12 comprises a central, tubular driving shaft 26 on which is carried a continuous helical or spiral blade 28 (called in the art the flighting) of steel, which blade encircles and radiates from the driving shaft 26. The inner edge 30 of the flighting 28 engages with and is secured to the driving shaft 26, for example, by welding, whilst the outer edge 32 of the flighting cooperates relatively closely with the bore 34 of the casing.

The left hand end of the driving shaft extends through the bearing 14 carried in the end plate 18 and is connected to the output shaft 16 of a speed reducing gear unit 38, which unit is secured to the end of the casing 10. An input shaft 40 of the gear unit 18 is coupled to the output shaft 42 of an electric driving motor 44 which is coupled to the gear unit and is supplied through input terminals 46 as required by an electric control unit 48.

Energisation of the driving motor 44 causes anti-clockwise rotation (as seen from the inlet end of the casing 10) of the driving shaft 26 and associated flighting 28, so that any free-flowing material supplied to the casing inlet end through the hopper 22 is engaged by the flighting and propelled from the inlet end to the outlet end of the casing, there to exit from the casing through the outlet duct 24.

The flighting 28 has a cross section transverse to the driving shaft which has the shape shown in the FIG. 2. From that Figure, it will be observed that:

(a) the flighting has its greatest thickness at its inner edge 30 where it abuts the cylindrical surface of the driving shaft 26;

(b) the thickness of the flighting progressively reduces in a linear manner for the greater part of its radial extent, that is until the intermediate diameter 50 is reached;

(c) at that intermediate diameter the thickness of the flighting smoothly increases by a substantial amount over a small increase in diameter; and (d) that thereafter with increase in diameter the thickness remains substantially constant at that greater thickness.

Figure 3:
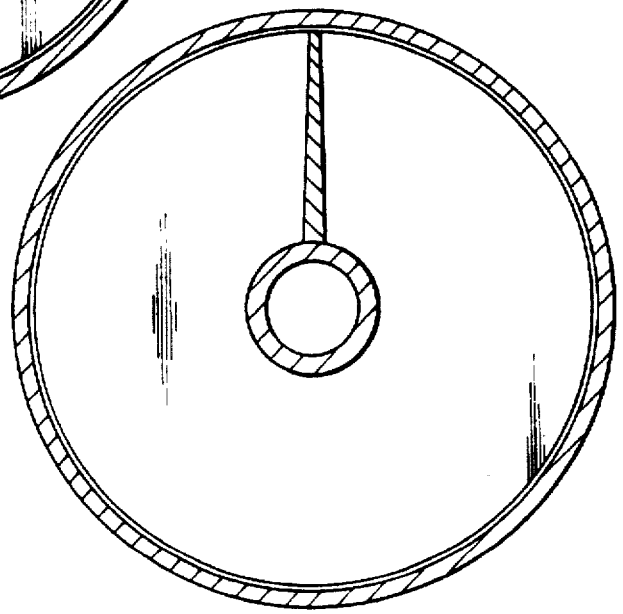
FIG. 3 shows a transverse section, similar to that of FIG. 2, of a prior art screw member over which the screw member of FIGS. 1 and 2 offers a substantial advantage.

This transverse profile of the flighting should be compared with the corresponding transverse profile of the conventional (prior art) continuous rolled flighting, which is illustrated in the FIG. 3. It will be observed that there the thickness of the prior art flighting decreases progressively from its maximum value at its inner edge to its minimum value at its outer edge.

It should also be noted that in operation, the rate of surface wear of the flighting due to its frictional contact with the material being propelled by the flighting increases with increase in the circumferential speed of the flighting surface relative to the material being propelled; and that the rate of frictional wear thus increases with the diameter at which the propelled material contacts the flighting.

The rate of surface wear is thus minimal at the inner edge of the flighting, and maximal at the outer edge. Hence, the thinnest part of the flighting suffers the greatest rate of wear, and has the least life expectancy. This gives rise to a need for early replacement of the flighting; or otherwise a need for early refurbishment to add a replacement outer portion of the flighting, or alternatively to build up the thickness of the worn outer portion of the flighting, for example—by welding.

The invention thus provides a means of enhancing the life expectancy of the flighting, by providing a thickened outer portion on the flighting. The radial extent of that thickened portion, and the increase in thickness in that portion can be adjusted so as to suit the particular requirements of the field of application of a particular screw conveyor and the material of the flighting.

Whereas in the embodiment described above with reference to the FIGS. 1 and 2, the thickening of the flight outer edge portion is shown protruding on the left hand side only (i.e. the material propelling side) of the profile (as seen in FIG. 2), the desired thickening could alternatively be produced on the other side of the profile, or partly on both sides of the profile.

By way of example only, in a screw conveyor having the following salient flighting dimensions:

outer edge diameter—225 mm inner edge diameter—60 mm axial pitch of the flighting turns—225 mm;

the outer edge thickness of the flighting according to the invention is of the order of 3.2 mm, whereas without that thickening the outer edge thickness would have been typically 2.3 mm in a prior art flighting made from steel strip of the same specification and thickness (4.7 mm).

Continuous flighting according to the present invention may be rolled in outside diameters ranging from approximately 40 mm to approximately 800 mm, with outer edge thickening designed and suited by experiment to the type of application for which the flighting is intended.

Continuous flighting according to the present invention as described above with reference to the FIGS. 1 and 2 may be produced on a conventional continuous flighting-rolling machine in which there has been substituted in place of its existing conventional prior art rolls, a pair of flighting-forming rolls in which at least one of the rolls has a modified rolling surface designed to produce the flighting profile illustrated in FIG. 2, or one of the modified forms thereof mentioned above.

Figure 4:
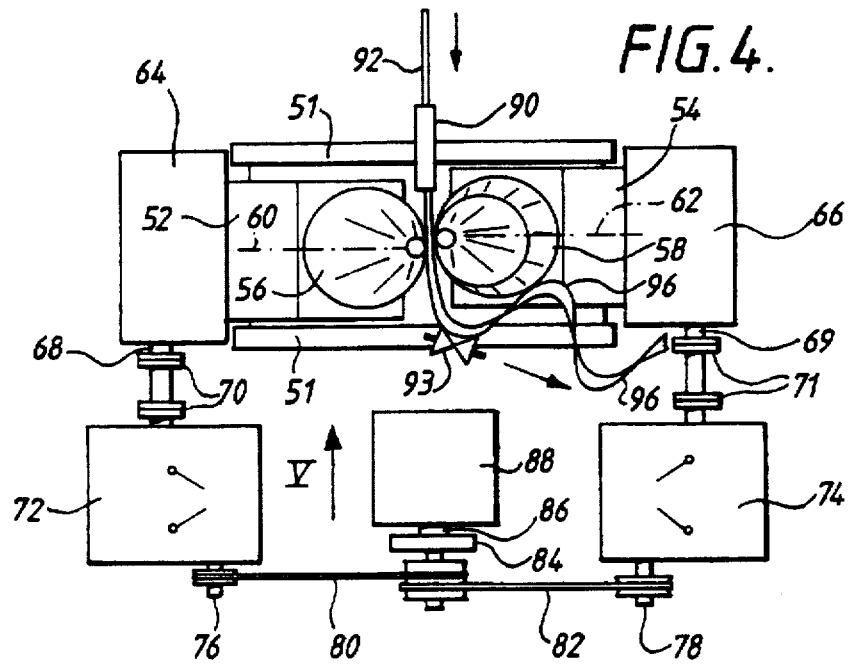
FIG. 4 shows a diagrammatic plan view of the principal components of a flighting rolling machine arranged for producing the continuous rolled flighting of the screw member shown in the FIGS. 1 and 2.

In the rolling machine shown in plan view in FIG. 4, a base structure 51 supports two roll housings 52,54 in which two conical flight-forming rolls 56,58 are mounted for rotation about transversely off-set axes 60,62 and at a mutual inclination such that the conical rolling surfaces of the cones contact one another along respective radial lines.

Coupled to the respective roll housings 52,54 are speed reduction gear boxes 64,66 having input drive shafts 68,69 coupled through respective pairs of universal couplings 70,71 to respective speed-change selector boxes 72,74. Input shafts 76,78 of those selector boxes are coupled through timing belt transmissions 80,82 and a clutch 84 to an output shaft 86 of an electric driving motor 88.

A strip guide 90 positions and guides the raw metal strip material 92 transversely into the nip of the rotating rolls 56,58. The rolled strip emerges therefrom moving to the right as seen in FIG. 4, and rising out of the plane of the paper carrying that Figure to form a helical or spiral blade constituting continuous flighting. The flighting moves into contact with a supporting roller 93 which is mounted on a compound table (not shown) for adjustment in 'x' and 'y' directions and which serves to support/control the flighting at its outer edge. That compound table is used in appropriate cases to control (a) the diameter of the outer edge of the flighting, and/or (b) the axial pitch of the successive turns of the flighting.

Figure 5:
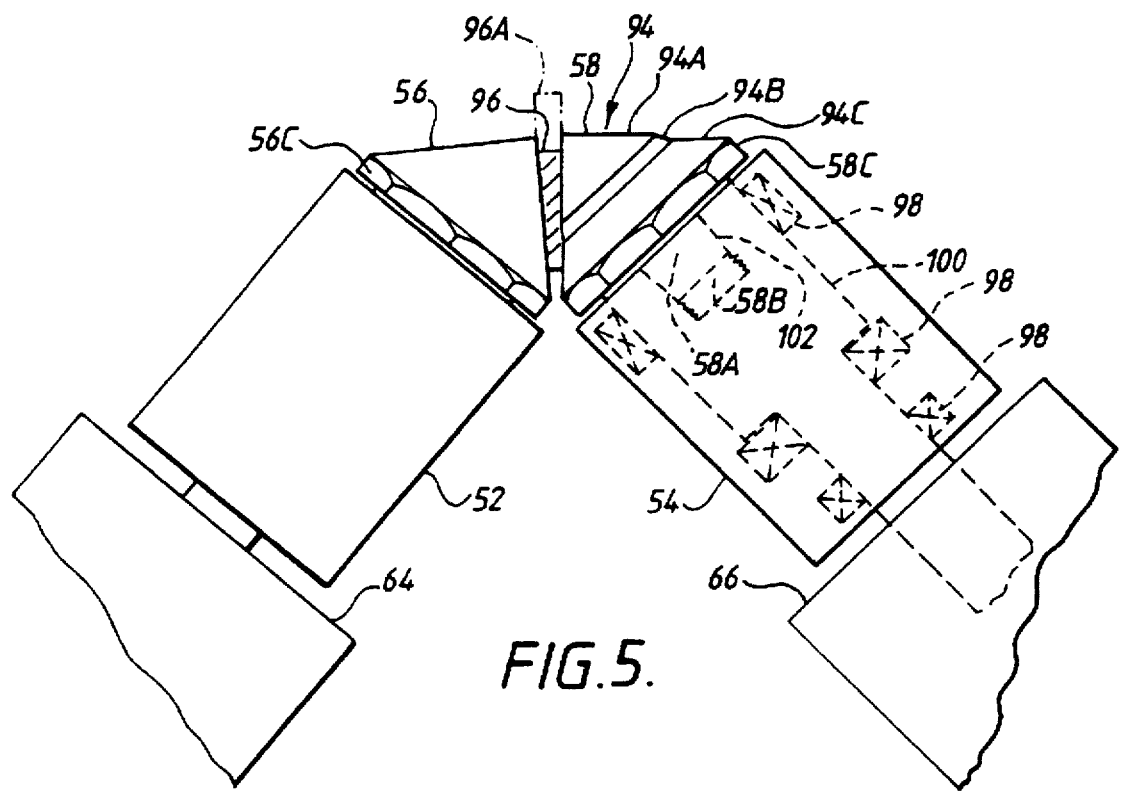
FIG. 5 shows a side elevation looking in the direction of the arrow 'V' shown in FIG. 4, and showing in particular the configuration and shape of the flighting-forming rolls incorporated in the apparatus of FIG. 4.

FIG. 5 shows in side elevation, as seen from the exit side of the rolls 56,58, the disposition and shape of those rolls 56,58, their associated roll housings 52,54 and parts of the associated speed reduction gear boxes 64,66.

It will be observed that the right hand roll 58 has a compound, generally-conical, stepped surface 94, which surface comprises three successive sections 94A, 94B, 94C. The sections 94A and 94C comprise respectively an 'apex' conical surface and a 'base' conical surface which are spaced and connected smoothly by the generally conical transition or 'step' surface 94B.

The cross sectional shape of the strip emerging from between the rolls is indicated at 96 between the roll surfaces.

If desired, the rolls 56,58 may have, in conventional manner, integral driving shafts which are rotatably mounted in bearings carried in the roll housings 52,54. That mode of construction renders the rolls not readily removable from their respective roll housings. However, since it is necessary to use In accordance with (a) the dimensions and nature of the strip material to be rolled and (b) the profile of the flighting to be produced, a stepped conical roll 58 specifically suited to production of the desired flighting, it is advantageous in accordance with a further feature of the present invention to make at least the stepped roll 58 in the manner of that shown in the FIG. 6, and to removably secure it in a socketed end of a driving shaft carried permanently in the roll housing 54.

Figure 6:
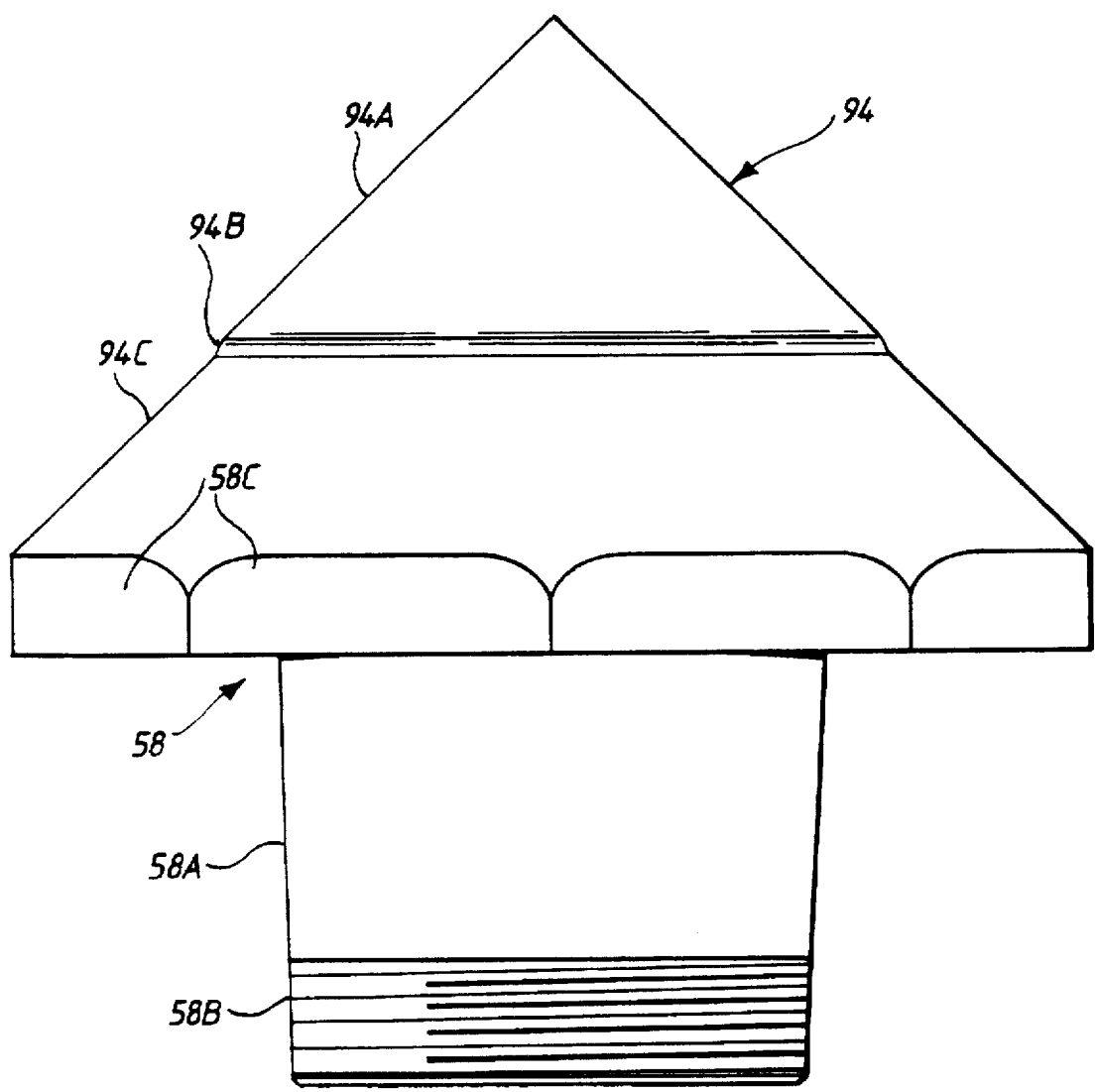
FIG. 6 shows in side elevation a modified form of flighting-forming roll for substitution in place of the right hand roll of the flighting-forming machine shown in FIG. 5.

As shown in FIG. 6, that roll has a tapered stub-shaft 58A, a screw-threaded end portion 58B, and octagon flats 58C formed around the lower part of the conical surface 94C for facilitating manual rotation of the roll by means of a spanner.

FIG. 5 shows in dotted form the manner in which that removable conical roll 58 is carried in its roll housing 54. Bearings 98 secured in the roll housing 54 carry a rotatable, socketed driving shaft 100. That shaft has formed in its upper end a tapered and screw-threaded socket 102 in which is received the tapered and screw-threaded stub shaft 58A formed integrally with the conical roll 58. The conical roll 58 can thus be readily unscrewed and removed from its driving shaft 100 whenever it is necessary to substitute in its place another conical roll of different configuration.

This mode of construction considerably reduces the machine down-time whilst changing from one flight-forming operation to a different one requiring a differently stepped conical roll 58.

If desired, the plain conical roll 56 can also be made in the same readily separable manner so as to render that roll readily removable without dissembling the associated roll housing, when it needs replacing or refurbishing.

Whereas in the FIG. 4, the flight-forming rolls 56,58 are shown with their rotational axes 60,62 disposed in spaced parallel planes (i.e. transversely off-set from one another), the machine may include means for adjusting the off-set of the rotational axes, so as to increase or decrease it and thereby influence the shape of the flighting emerging from the rolls. If desired, the off-set can be reduced to zero value, so that the rotational axes lie in a common plane.

It should be noted that:

(a) the degree of off-set of those rotational axes and the pressure exerted on the strip material moving into the nip of the rolls are major factors in determining the dimensions of the flighting emerging from between the rolls;

(b) by stepping one or both of the conical rolling surfaces of the rolls in the manner described above, the pressure exerted by the rolls on the outer edge portion of the flighting is diminished so that the thickened outer edge portion is produced;

(c) the thickening of the outer edge portion Is best disposed on the side of the flighting that contacts the material being propelled, though it may provided wholly on the other side of the flighting, or partly on both sides thereof;

(d) though in the embodiments described above, the stepped roll 58 has but one smooth, graduated step 98B in its rolling surface, the transition from the apex conical surface 94A to the base conical surface 94C may, if desired, be made in any other suitable manner, e.g. by a series of small smooth steps; and (e) in the stepped roll 58, the cone angles of the respective apex and base conical surfaces 94A and 94C may be the same or different, according to the nature of the transverse profile of the flighting to be rolled.

It will be appreciated that the method of making the flighting of the present invention comprises:

(a) setting up in the manner described above with reference to the drawings, a pair of flighting-forming rolls at least one of which has a conical rolling surface which is stepped in a manner according to the present invention;

(b) rotating the rolls in complementary directions;

(c) guiding a metal strip of substantially rectangular transverse cross section into the nip of the rolls; and (d) receiving the flighting emerging from between the rolls in a suitable supporting means.

In the embodiments described above, the flighting has been produced from a metal strip of substantially rectangular cross section by passing the whole of the transverse width of the strip between the rolls 56,58, as Indicated at 96 in FIG. 5. Another form of flighting may be produced by passing only a part of the transverse width of a metal strip between those rolls, to produce a flighting according to the present Invention in which there is an unrolled root portion of substantially constant thickness. Such a flighting would have the cross section indicated at 96 in FIG. 5, but modified by the presence of an integral root portion of constant thickness as indicated in chain-dotted form at 96A.

From the afore-going description, it will be appreciated that, as compared with the prior art methods of rolling continuous flighting from strip material, the rolling methods and machines according to the present invention provide in the rolled flighting produced thereby a thicker outer edge (typically 50% thicker) without the need to alter the width or thickness of the ingoing raw strip material.

In some screw conveyors embodying continuous rolled flighting, the conveyor screw may rotate at speeds up to one thousand revolutions per minute. In such conveyors, the rotating screw imparts a considerable centrifugal action to the material being propelled axially by the screw. That centrifugal action causes the propelled material to be thrown radially outwards whilst it is being propelled forwardly. Thus, in a screw conveyor having a prior art continuous rolled flighting in which the flighting thins progressively from the inner to the outer edge, some of the propelled material slides retrogressively over the propulsion surface towards the outer edge as the screw rotates, and is fed Into the radial gap between that outer edge and the enclosing conveyor casing. This increases the wear of the flighting towards and at the outer edge thereof.

In contrast, in a screw conveyor having a flighting according to the present invention, the change in direction of the propulsion surface radially of the flighting at the step disposed at the said intermediate radius imparts a forward motion to the material sliding radially outwardly over the propulsion surface. This tends to reduce (a) the pressure of the propelled material on the outer part of that surface and consequently the wear of that surface, (b) the pressure directing material into the gap between the screw and the casing and consequently the material being fed into that gap, and (c) the wear of the outer edge of the flighting.

Although a preferred embodiment of the invention has been specifically illustrated and described herein, it is to be understood that minor variations may be made in the apparatus without departing from the spirit and scope of the invention, as defined the appended claims.

I claim:

1. A method of producing continuous rolled flighting suitable for use in screw conveyors and augers, the flighting including a continuous helical blade having radially spaced inner and outer helical edges, the continuous helical blade being formed integrally by (i) an inner helical portion which extends radially from the inner helical edge to a predetermined intermediate radius and (ii) an outer helical portion which extends from the predetermined intermediate radius to the outer helical edge, the transverse thickness of the continuous helical blade in the inner helical portion decreasing gradually from a maximum value to a minimum value at the intermediate radius, and the thickness of the continuous helical blade in the outer helical portion being no less than the minimum value;

the method comprising the steps of:
(a) providing a pair of opposed, mutually-inclined conical rolls of which at least a first of the conical rolls has a stepped conical rolling surface divided by a graduated diameter-reducing step progressing from an 'apex' conical section of the rolling surface to a 'base' conical section of the rolling surface thereby upon rolling a helical blade from a metal strip to produce a pressure differential in adjoining inner and outer helical portions respectively of the helical blade;

(b) rotating the conical rolls in complementary directions;

(c) introducing a continuous metal strip of substantially rectangular cross section and substantially constant height between the rotating conical rolls thereby causing the metal strip to be converted by the rotating conical rolls into a helical blade constituting said continuous rolled flighting, the inner helical portion being formed by the apex conical section of the stepped rolling surface, and the outer helical portion being formed by the base conical section of the stepped rolling surface and projecting outwardly on at least one side of the helical blade relative to an adjacent surface of the inner portion of the helical blade; and (d) receiving and supporting the flighting upon emerging from the conical rolls;

the conical rolls and the diameter-reducing step of the first conical roll being operative such that in performing step (c) the continuous metal strip is converted by the conical rolls alone into said continuous helical blade, without substantially reducing the height of the metal strip and without a simultaneous application to the metal strip of pressures directed transversely to the pressures exerted on the metal strip by the conical rolls.

2. The method of producing continuous rolled flighting according to claim 1 wherein in performing step (c) the continuous metal strip is introduced between the rotating conical rolls such that in the helical blade emerging from the conical rolls the blade thickness decreases gradually only from a predetermined radius disposed between the inner helical edge and the intermediate radius.

3. Apparatus for producing continuous rolled flighting suitable for use in screw conveyors and augers, the flighting including a continuous helical blade having radially spaced inner and outer helical edges, the continuous helical blade being formed integrally by (i) an inner helical portion which extends radially from the inner helical edge to a predetermined intermediate radius and (ii) an outer helical portion which extends from the predetermined intermediate radius to the outer helical edge, the transverse thickness of the continuous helical blade in the inner helical portion decreasing gradually from a maximum value to a minimum value at the intermediate radius, and the thickness of the continuous helical blade in the outer helical portion being no less than the minimum value;

the apparatus comprising:
(a) a pair of opposed, mutually-inclined conical rolls of which at least a first of the conical rolls has a stepped conical rolling surface divided by a graduated diameter-reducing step progressing from an 'apex' conical section of the rolling surface to a 'base' conical section of the rolling surface thereby upon rolling a helical blade from a metal strip to produce a pressure differential in adjoining inner and outer helical portions respectively of the helical blade;

(b) means for rotating the conical rolls in complementary directions;

(c) means for introducing a continuous metal strip of substantially rectangular cross section and substantially constant height between the rotating conical rolls thereby causing the metal strip to be converted by the rotating conical rolls and the pressure differential exerted therebetween on the metal strip into a helical blade constituting said continuous rolled flighting, the inner helical portion being formed by the apex conical section of the stepped rolling surface, and the outer helical portion being formed by the base conical section of the stepped rolling surface and projecting outwardly on at least one side of the helical blade relative to an adjacent surface of the inner portion of the helical blade; and (d) means for receiving and supporting the flighting upon emerging from the conical rolls;

the conical rolls and the diameter-reducing step of the first conical roll being constructed and arranged such that the conical rolls alone convert the continuous metal strip into said continuous helical blade, without substantially reducing the height of the metal strip and without a simultaneous application to the metal strip of pressures directed transversely to the pressures exerted on the metal strip by the conical rolls.

4. The apparatus according to claim 3 including a roll housing for housing the first conical roll, a roll shaft rotatably mounted in the roll housing, the roll shaft having formed therein at one end a roll-receiving socket, and the first conical roll being provided with roll attachment means for detachably securing the first conical roll in the roll-receiving socket.

5. The apparatus according to claim 3 wherein the conical rolls are positioned with rotational axes thereof offset from one another in transversely spaced planes, and the rotational axes have no common point of intersection.

6. The apparatus according to claim 4 wherein said roll attachment means comprises (a) a tapered stub shaft carried by the first conical roll and provided with a screw-threaded end portion and (b) said roll-receiving socket being tapered for receiving the tapered stub shaft, and a screw thread in said roll-receiving socket for receiving the screw-threaded end portion of the stub shaft.

7. A method of producing continuous rolled flighting suitable for use in screw conveyors and augers, the flighting including a continuous helical blade having radially spaced inner and outer helical edges, the continuous helical blade being formed integrally by (i) an inner helical portion which extends radially from the inner helical edge to a predetermined intermediate radius and (ii) an outer helical portion which extends from the predetermined intermediate radius to the outer helical edge, the transverse thickness of the continuous helical blade in the inner helical portion decreasing gradually from a maximum value to a minimum value at the intermediate radius, and the thickness of the continuous helical blade in the outer helical portion being greater than the minimum value;

the method comprising the steps of:

(a) providing a pair of opposed, mutually-inclined conical rolls of which only a first of the conical rolls has a stepped conical rolling surface divided by a graduated diameter-reducing step progressing from an "apex" conical section of the rolling surface to a "base" conical section of the rolling surface thereby upon rolling a helical blade from a metal strip to produce a pressure differential in adjoining inner and outer helical portions respectively of the helical blade, and of which a second of the conical roll has an unstepped conical rolling surface;

(b) rotating the conical rolls in complementary directions;

(c) introducing a continuous metal strip of substantially rectangular cross section and substantially constant height between the rotating conical rolls thereby causing the metal strip to be converted by the rotating conical rolls into a helical blade constituting said continuous rolled flighting, the inner helical portion being formed by the apex conical section of the stepped rolling surface, and the outer helical portion being formed by the base conical section of the stepped rolling surface and projecting outwardly on one side of the helical blade relative to an adjacent surface of the inner portion of the helical blade; and (d) receiving and supporting the flighting upon emerging from the conical rolls;

the conical rolls and the diameter-reducing step of the first conical roll being operative such that in performing step (c) the continuous metal strip is converted by the conical rolls into said continuous helical blade without substantially reducing the height of the metal strip and without a simultaneous application to the metal strip of pressures directed transversely to the pressures exerted on the metal strip by the conical rolls.

8. The method of producing continuous rolled flighting according to claim 7 wherein in performing step (c) the continuous metal strip is introduced between the rotating conical rolls such that in the helical blade emerging from the conical rolls the blade thickness decreases gradually only from a predetermined radius disposed between the inner helical edge and the intermediate radius.

9. Apparatus for producing continuous rolled flighting suitable for use in screw conveyors and augers, the flighting including a continuous helical blade having radially spaced inner and outer helical edges, the continuous helical blade being formed integrally by (i) an inner helical portion which extends radially from the inner helical edge to a predetermined intermediate radius and (ii) an outer helical portion which extends from the predetermined intermediate radius to the outer helical edge, the transverse thickness of the continuous helical blade in the inner helical portion decreasing gradually from a maximum value to a minimum value at the intermediate radius, and the thickness of the continuous helical blade in the outer helical portion being greater than the minimum value;

the apparatus comprising;

(a) a pair of opposed, mutually-inclined conical rolls of which only a first of the conical rolls has a stepped conical rolling surface divided by a graduated diameter-reducing step progressing from an "apex" conical section of the rolling surface to a "base" conical section of the rolling surface thereby upon rolling a helical blade from a metal strip to produce a pressure differential in adjoining inner and outer helical portions respectively of the helical blade, and of which a second of the conical rollers has an unstepped conical rolling surface.

(b) means for rotating the conical rolls in complementary directions;

(c) means for introducing a continuous metal strip of substantially rectangular cross section and substantially constant height between the rotating conical rolls thereby causing the metal strip to be converted by the rotating conical rolls and the pressure differential exerted therebetween on the metal strip into a helical blade constituting said continuous rolled flighting, the inner helical portion being formed by the apex conical section of the stepped rolling surface, and the outer helical portion being formed by the base conical section of the stepped rolling surface and projecting outwardly on one side of the helical blade relative to an adjacent surface of the inner portion of the helical blade; and (d) means for receiving and supporting the flighting upon emerging from the conical rolls;

the conical rolls and the diameter-reducing step of the first conical roll being constructed and arranged such that the conical rolls convert the continuous metal strip into said continuous helical blade without substantially reducing the height of the metal strip and without a simultaneous application to the metal strip of pressures directed transversely to the pressures exerted on the metal strip by the conical rolls.

10. The apparatus according to claim 9 including a roll housing for housing the first conical roll, a roll shaft rotatably mounted in the roll housing, the roll shaft having formed therein at one end a roll-receiving socket, and the first conical roll being provided with roll attachment means for detachably securing the first conical roll in the roll-receiving socket.

11. The apparatus according to claim 9 wherein the conical rolls are positioned with rotational axes thereof offset from one another in transversely spaced planes, and the rotational axes have no common point of intersection.

12. The apparatus according to claim 10 wherein said roll attachment means comprising (a) a tapered stub shaft carried by the first conical roll and provided with a screw-threaded end portion and (b) said roll-receiving socket being tapered for receiving the tapered stub shaft, and a screw thread in said roll-receiving socket for receiving the screw-threaded end portion of the stub shaft.

13. A method of producing continuous rolled flighting suitable for use in screw conveyors and augers, the flighting including a continuous helical blade having radially spaced inner and outer helical edges, the continuous helical blade being formed integrally by (i) an inner helical portion which extends radially from the inner helical edge to a predetermined intermediate radius and (ii) an outer helical portion which extends from the predetermined intermediate radius to the outer helical edge, the transverse thickness of the continuous helical blade in the inner helical portion decreasing gradually from a maximum value to a minimum value at the intermediate radius, and the thickness of the continuous helical blade in the outer helical portion being greater than the minimum value;

the method comprising the steps of:

(a) providing a pair of opposed mutually-inclined conical rolls having their respective axes of rotation disposed in transversely offset planes with the axes of rotation having no common point of intersection, a first of the conical rolls having a stepped conical rolling surface divided by a graduated diameter-reducing step progressing from an "apex" conical section of the rolling surface to a "base" conical section of the rolling surface thereby upon rolling a helical blade from a metal strip to produce a pressure differential in adjoining inner and outer helical portions respectively of the helical blade, and a second of the conical rolls having an unstepped conical rolling surface;

(b) rotating the conical rolls in complementary directions;

(c) introducing a continuous metal strip of substantially rectangular cross section and substantially constant height between the rotating conical rolls thereby causing the metal strip to be converted by the rotating conical rolls into a helical blade constituting said continuous rolled flighting, the inner helical portion being formed by the apex conical section of the stepped rolling surface, and the outer helical portion being formed by the base conical section of the stepped rolling surface and projecting outwardly on one side of the helical blade relative to an adjacent surface of the inner portion of the helical blade; and (d) receiving and supporting the flighting upon emerging from the conical rolls;

the conical rolls and the diameter-reducing step of the first conical roll being operative such that in performing step (c) the continuous metal strip is converted by the conical rolls into said continuous helical blade without substantially reducing the height of the metal strip and without a simultaneous application to the metal strip of pressures directed transversely to the pressures exerted on the metal strip by the conical rolls.

14. The method of producing continuous rolled flighting according to claim 13 wherein in performing step (c) the continuous metal strip is introduced between the rotating conical rolls such that in the helical blade emerging from the conical rolls the blade thickness decreases gradually only from a predetermined radius disposed between the inner helical edge and the intermediate radius.

15. Apparatus for producing continuous rolled flighting suitable for use in screw conveyors and augers, the flighting including a continuous helical blade having radially spaced inner and outer helical edges, the continuous helical blade being formed integrally by (i) an inner helical portion which extends radially from the inner helical edge to a predetermined intermediate radius and (ii) an outer helical portion which extends from the predetermined intermediate radius to the outer helical edge, the transverse thickness of the continuous helical blade in the inner helical portion decreasing gradually from a maximum value to a minimum value at the intermediate radius, and the thickness of the continuous helical blade in the outer helical portion being greater than the minimum value;

the apparatus comprising:

(a) a pair of opposed, mutually-inclined conical rolls having their respective axes of rotation disposed in transversely offset planes with the axes of rotation having no common point of intersection, a first of the conical rolls having a stepped conical rolling surface divided by a graduated diameter-reducing step progressing from an "apex" conical section of the rolling surface to a "base" conical section of the rolling surface thereby upon rolling a helical blade from a metal strip to produce a pressure differential in adjoining inner and outer helical portions respectively of the helical blade, and a second of the conical rolls having an unstepped conical rolling surface;

(b) means for rotating the conical rolls in complementary directions;

(c) means for introducing a continuous metal strip of substantially rectangular cross section and substantially constant height between the rotating conical rolls thereby causing the metal strip to be converted by the rotating conical rolls and the pressure differential exerted therebetween on the metal strip into a helical blade constituting said continuous rolled flighting, the inner helical portion being formed by the apex conical section of the stepped rolling surface, and the outer helical portion being formed by the base conical section of the stepped rolling surface and projecting outwardly on one side of the helical blade relative to an adjacent surface of the inner portion of the helical blade; and (d) means for receiving and supporting the flighting upon emerging from the conical rolls;

the conical rolls and the diameter-reducing step of the first conical roll being constructed and arranged such that the conical rolls convert the continuous metal strip into said continuous helical blade without substantially reducing the height of the metal strip and without a simultaneous application to the metal strip of pressures directed transversely to the pressures exerted on the metal strip by the conical rolls.

16. The apparatus according to claim 15 including a roll housing for housing the first conical roll, a roll shaft rotably mounted in the roll housing, the roll shaft having formed therein at one end a roll-receiving socket, and the first conical roll being provided with roll attachment means for detachably securing the first conical roll in the roll-receiving socket.

17. The apparatus according to claim 16 wherein said roll attachment means comprises (a) a tapered stub shaft carried by the first conical roll and provided with a screw-threaded end portion and (b) said roll-receiving socket being tapered for receiving the tapered stub shaft, and a screw thread in said roll-receiving socket for receiving the screw-threaded end portion of the stub shaft.

* * * * *

UNITED STATES PATENT AND TRADEMARK OFFICE
CERTIFICATE OF CORRECTION

PATENT NO. : 5,678,440
DATED : October 21, 1997
INVENTOR(S) : Michael Douglas HAMILTON It is certified that error appears in the above-indentified patent and that said Letters Patent is hereby corrected as shown below:

On the title page, item [63],

The "Related U.S. Application Data" should read as follows:

-- Continuation of Ser. No. 403,704, filed Mar. 17, 1995, now abandoned, which was the national stage of international application number PCT/GB93/01932, filed Sept. 13, 1993. -- item [30],

The "Foreign Application Priority Data: should read as follows:

-- Sep. 21, 1992 [GB] United Kingdom..... 9219950

Signed and Sealed this

Thirteenth Day of October 1998

Attest:

Attesting Officer

BRUCE LEHMAN

Commissioner of Patents and Trademarks